(12) United States Patent
Yamada et al.

(10) Patent No.: US 10,899,197 B2
(45) Date of Patent: Jan. 26, 2021

(54) AIR CONDITIONER, AIR CONDITIONING SYSTEM, AND AIR-CONDITIONING CONTROLLER

(71) Applicant: DENSO CORPORATION, Kariya (JP)

(72) Inventors: Etsuhisa Yamada, Kariya (JP); Satoshi Ito, Kariya (JP); Hiroya Hasegawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/700,805

(22) Filed: Dec. 2, 2019

(65) Prior Publication Data

US 2020/0101819 A1 Apr. 2, 2020

Related U.S. Application Data

(63) Continuation of application No. PCT/JP2018/019066, filed on May 17, 2018.

(30) Foreign Application Priority Data

Jun. 28, 2017 (JP) .................................. 2017-125934

(51) Int. Cl.
 *B60H 1/00* (2006.01)
 *B60H 1/32* (2006.01)
 (Continued)

(52) U.S. Cl.
 CPC ..... *B60H 1/00921* (2013.01); *B60H 1/00914* (2013.01); *B60H 1/3213* (2013.01);
 (Continued)

(58) Field of Classification Search
 CPC ............ B60H 1/00921; B60H 1/00914; B60H 1/3211; B60H 1/3232; B60H 1/00;
 (Continued)

(56) References Cited

U.S. PATENT DOCUMENTS 5,299,431 A 4/1994 Iritani et al.
5,605,051 A 2/1997 Iritani et al.
(Continued)

FOREIGN PATENT DOCUMENTS

JP H05319077 A 12/1993
JP H0661526 U 8/1994
(Continued)

*Primary Examiner* — Emmanuel E Duke
(74) *Attorney, Agent, or Firm* — Harness, Dickey & Pierce, P.L.C.

(57) ABSTRACT

An air conditioner includes an inside condenser, an outside heat exchanger, an inside evaporator, a refrigerant circuit switcher, and an air passage switcher. The refrigerant circuit switcher is configured to switch a layout of the refrigerant circuit to (i) a first circuit during a heating mode such that the refrigerant releases heat at the inside condenser and is decompressed to evaporate at the outside heat exchanger and (ii) a second circuit during a defrosting mode such that the refrigerant releases heat at the outside heat exchanger and is decompressed to evaporate at the inside evaporator. The air passage switcher is configured to switch the air passage to (i) a first passage during the heating mode such that the air passes through the inside evaporator and the inside condenser and (ii) a second passage during the defrosting mode such that the air bypasses the inside condenser.

8 Claims, 4 Drawing Sheets

(51) Int. Cl.
*F25B 13/00* (2006.01)
*F25B 41/04* (2006.01)

(52) U.S. Cl.
CPC .............. *F25B 13/00* (2013.01); *F25B 41/04* (2013.01); *B60H 2001/00949* (2013.01); *B60H 2001/00961* (2019.05)

(58) Field of Classification Search
CPC .... B60H 1/22; B60H 1/3204; B60H 1/00814; B60H 1/00878; B60H 1/3213; B60H 2001/00961; B60H 2001/00949; F25B 41/04; F25B 13/00; F24F 3/14
See application file for complete search history.

(56) References Cited

U.S. PATENT DOCUMENTS

| | | | |
|---|---|---|---|
| 5,642,627 | A | 7/1997 | Iritani et al. |
| 5,685,162 | A | 11/1997 | Iritani et al. |
| 5,983,652 | A | 11/1999 | Iritani et al. |
| 6,044,653 | A | 4/2000 | Iritani et al. |
| 6,212,900 | B1 | 4/2001 | Iritani et al. |
| 6,430,951 | B1 | 8/2002 | Iritani et al. |
| 2010/0326127 | A1* | 12/2010 | Oomura ............. B60H 1/00785 62/498 |
| 2012/0227431 | A1* | 9/2012 | Wang .................... B60H 1/143 62/238.7 |
| 2012/0255319 | A1* | 10/2012 | Itoh ....................... F24F 3/1405 62/160 |
| 2013/0305759 | A1 | 11/2013 | Tsunoda et al. |
| 2014/0069123 | A1* | 3/2014 | Kim ......................... F25B 5/04 62/61 |
| 2015/0239322 | A1* | 8/2015 | Yokoo ...................... F25B 5/04 62/158 |
| 2015/0292780 | A1* | 10/2015 | Kitamura ................ F25B 13/00 62/324.1 |
| 2016/0185185 | A1 | 6/2016 | Suzuki et al. |
| 2016/0193896 | A1* | 7/2016 | Miyakoshi ......... B60H 1/00385 62/155 |
| 2017/0080778 | A1* | 3/2017 | Suzuki ............... B60H 1/00921 |

FOREIGN PATENT DOCUMENTS

| | | | |
|---|---|---|---|
| JP | 2013241097 A | 12/2013 | |
| JP | 2013241171 A | 12/2013 | |
| JP | 2014070867 A * | 4/2014 | ............. F25B 49/02 |
| JP | 2015155277 A | 8/2015 | |
| JP | 2016132271 A | 7/2016 | |
| JP | 6125312 B2 | 5/2017 | |

* cited by examiner

AIR CONDITIONER, AIR CONDITIONING SYSTEM, AND AIR-CONDITIONING CONTROLLER

CROSS REFERENCE TO RELATED APPLICATION

The present application is a continuation application of International Patent Application No. PCT/JP2018/019066 filed on May 17, 2018, which designated the U.S. and claims the benefit of priority from Japanese Patent Application No. 2017-125934 filed on Jun. 28, 2017. The entire disclosures of all of the above applications are incorporated herein by reference.

TECHNICAL FIELD

The present disclosure relates to an air conditioner, an air conditioning system, and an air-conditioning controller.

BACKGROUND

Air conditioners perform a heating of an air-conditioning target space. The air conditioner includes a vapor compression refrigeration cycle system that adjusts the temperature of air blown into a space to be air-conditioned. At the time of heating operation, the circuit configuration of the refrigeration cycle system is switched to a cycle configuration in which heat absorbed from the outside air in an outside heat exchanger is released to the air in an inside condenser.

SUMMARY

An air conditioner includes an inside condenser, an outside heat exchanger, an inside evaporator, a refrigerant circuit switcher, an auxiliary heater, an air passage forming portion, and an air passage switcher. The inside condenser is configured to exchange heat between a refrigerant that was compressed and discharged from a compressor and an air that is to be conveyed to an air-conditioning target space. The outside heat exchanger is configured to exchange heat between the refrigerant that flowed out of the inside condenser and an outside air. The inside evaporator is configured to exchange heat between the refrigerant that flowed out of the outside heat exchanger and the air such that the refrigerant evaporates. The refrigerant circuit switcher is configured to switch a layout of a refrigerant circuit through which the refrigerant circulates. The auxiliary heater is configured to heat the air. The air passage forming portion defines an air passage through which the air flows. The air passage switcher is configured to switch the air passage. The inside condenser, the inside evaporator, and the auxiliary heater are disposed in the air passage. The refrigerant circuit switcher is configured to switch the layout of the refrigerant circuit to (i) a first circuit during a heating mode such that the refrigerant releases heat at the inside condenser and is decompressed to evaporate at the outside heat exchanger and (ii) a second circuit during a defrosting mode such that the refrigerant releases heat at the outside heat exchanger and is decompressed to evaporate at the inside evaporator. The air passage switcher is configured to switch the air passage to (i) a first passage during the heating mode such that the air passes through the inside evaporator and the inside condenser in this order and (ii) a second passage during the defrosting mode such that the air bypasses the inside condenser and passes through the inside evaporator and the auxiliary heater in this order.

EMBODIMENTS

Comparative Example

First, an air conditioner according to a comparative example of the present disclosure will be described below. The air conditioner according to the comparative example includes a vapor compression refrigeration cycle system that adjusts the temperature of air blown into a space to be air-conditioned. At the time of heating operation, the circuit configuration of the refrigeration cycle system is switched to a cycle configuration in which heat absorbed from the outside air in an outside heat exchanger is released to the air in an inside condenser.

Such a cycle configuration causes frost formation on the outside heat exchanger in some cases when a refrigerant evaporating temperature in the outside heat exchanger is decreased. The frost formation on the outside air heat exchanger reduces heat exchange performance of the outside heat exchanger, thereby causing reduced heating performance of the refrigeration cycle system.

Accordingly, the air conditioner according to the comparative example includes, as an auxiliary heater for heating air, a heat medium-air heat exchanger that heats air using a heat medium heated by an electric heater as a heat source.

If the frost formation on the outside heat exchanger progresses at the time of heating operation, the air conditioner according to the comparative example cannot heat the air sufficiently by the heating of the heat medium-air heat exchanger alone, whereby the heating performance is reduced. Thus, the defrosting operation for removing frost is desirably performed when the frost is formed on the outside heat exchanger.

Another type of air conditioner includes a refrigeration cycle system that performs defrosting operation for removing frost when the frost is formed on an outside heat exchanger. At the time of defrosting operation, the refrigeration cycle system of this type of air conditioner performs switching to a cycle configuration in which the heat absorbed from air in an inside condenser is released in the outside heat exchanger.

The air conditioner according to the comparative example can perform the defrosting operation similar to this type of air conditioner. However, even if the air conditioner according to the comparative example performs the defrosting operation similar to this type of air conditioner, air cannot be heated in the inside condenser and the heat medium-air heat exchanger during the defrosting operation so that the heating performance cannot be exerted during the defrosting operation.

The present disclosure has been made in view of those points and aims to provide an air conditioner that can prevent reduction in the heating performance even during defrosting operation of an outside heat exchanger.

First Embodiment

An air conditioner 1 of a first embodiment will be described with reference to FIGS. 1 and 2. In the present embodiment, a refrigeration cycle system 10 is applied to the air conditioner 1 for a vehicle mounted on an electric vehicle that gains traveling propulsion from an electric motor for traveling. In the air conditioner 1, the refrigeration cycle system 10 cools or heats the air (blown air) blown into a vehicle compartment which is a space to be air-conditioned. Therefore, the fluid subjected to heat exchange in the present embodiment is the air.

Furthermore, the refrigeration cycle system 10 is configured to be able to switch the refrigerant circuit among a refrigerant circuit in a heating mode, a refrigerant circuit in a cooling mode, a refrigerant circuit in a series dehumidifying-heating mode, a refrigerant circuit in a parallel dehumidifying-heating mode, and a refrigerant circuit in a defrosting mode. Hereinafter, the series dehumidifying-heating mode and the parallel dehumidifying-heating mode may be referred to as a first dehumidifying-heating mode and a second dehumidifying-heating mode, respectively.

In the air conditioner 1, the heating mode is an operation mode in which the air is heated and blown into the vehicle compartment which is the space to be air-conditioned. The series dehumidifying-heating mode and the parallel dehumidifying-heating mode are operation modes in which the air cooled and dehumidified is reheated to be blown into the vehicle compartment which is the space to be air-conditioned. The cooling mode is an operation mode in which the air is cooled and blown into the vehicle compartment which is the space to be air-conditioned. The defrosting mode is an operation mode in which the heat of the air in the space to be air-conditioned is absorbed and released to an outside heat exchanger 16 so that frost adhering to the outside heat exchanger 16 is melted and removed.

Figure 1:
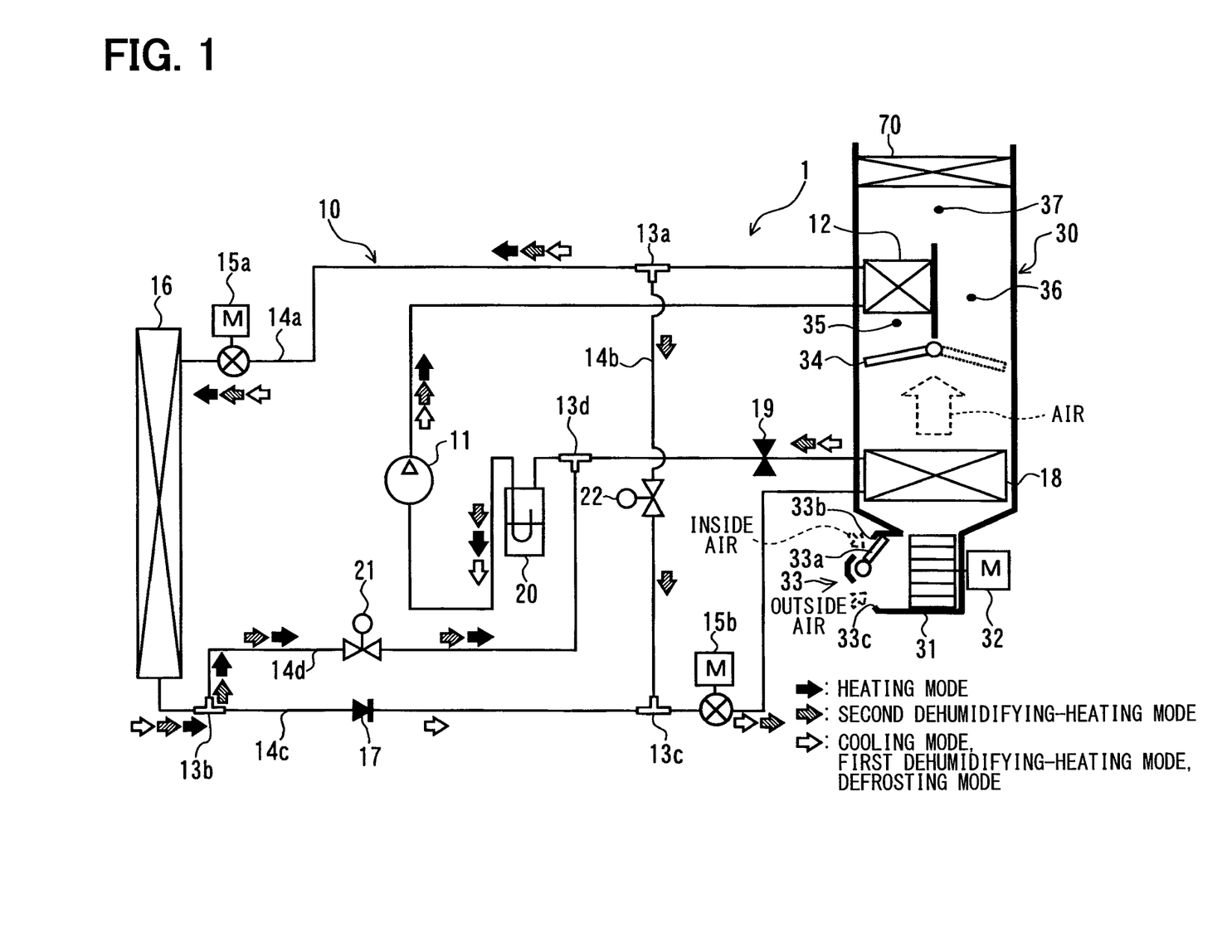
FIG. 1 is an overall configuration diagram of an air conditioner according to at least one embodiment.

FIG. 1 uses a solid arrow to indicate the flow of a refrigerant through the refrigerant circuit in the heating mode, a hatched arrow to indicate the flow of the refrigerant through the refrigerant circuit in the parallel dehumidifying-heating mode, and a hollow arrow to indicate the flow of the refrigerant through the refrigerant circuit in the series dehumidifying-heating mode and the cooling mode.

The refrigeration cycle system 10 adopts an HFC refrigerant (specifically, R134a) as the refrigerant, and forms a vapor compression subcritical refrigeration cycle in which a refrigerant pressure Pd does not exceed a critical pressure of the refrigerant. The refrigeration cycle system may of course adopt an HFO refrigerant (for example, R1234yf) or the like as the refrigerant. Refrigerant oil for lubricating a compressor 11 is also mixed in the refrigerant, and some of the refrigerant oil is circulated in the cycle along with the refrigerant.

Among components of the refrigeration cycle system 10, the compressor 11 draws in, compresses, and discharges the refrigerant in the refrigeration cycle system 10. The compressor 11 is disposed under the hood of a vehicle. The compressor 11 is built as an electric compressor in which a fixed capacity compression mechanism with a fixed discharge capacity is driven by an electric motor. Various compression mechanisms such as a scroll compression mechanism and a vane compression mechanism can be adopted as the compression mechanism.

The operation (for example, the rotation speed) of the electric motor is controlled by a control signal output from an air conditioning controller 40 described later, where either an AC motor or a DC motor may be adopted as the electric motor. The refrigerant discharge capacity of the compression mechanism is changed by the air conditioning controller 40 controlling the rotation speed of the electric motor. Therefore, in the present embodiment, the electric motor makes up a discharge capacity changing unit of the compression mechanism.

An outlet of the compressor 11 is connected to a refrigerant inlet of an inside condenser 12. The inside condenser 12 is a heating heat exchanger that heats the air at least in the heating mode by allowing heat exchange between the high temperature, high pressure refrigerant discharged from the compressor 11 and the air passing through an inside evaporator 18 described later to be blown into the space to be air-conditioned. The inside condenser 12 is disposed in a casing 31 of an inside air conditioning unit 30 described later.

A refrigerant outlet of the inside condenser 12 is connected to an inlet of a first three-way connector 13a. Such a three-way connector may be formed by joining a plurality of pipes, or may be formed by providing a plurality of refrigerant passages in a metal block or a resin block. The refrigeration cycle system 10 further includes second to fourth three-way connectors 13b to 13d as described later. The basic configuration of each of the second to fourth three-way connectors 13b to 13d is similar to that of the first three-way connector 13a.

These three-way connectors function as branch portions or merge portions. As for the first three-way connector 13a in the parallel dehumidifying-heating mode, for example, one of three openings is used as an inlet, and the remaining two are used as outlets. Therefore, the first three-way connector 13a in the parallel dehumidifying-heating mode functions as the branch portion that branches the flow of the refrigerant entering through the one inlet and allows the refrigerant to flow out through the two outlets.

Moreover, as for the fourth three-way connector 13d in the parallel dehumidifying-heating mode, for example, two of three openings are used as inlets, and the remaining one is used as an outlet. Therefore, the fourth three-way connector 13d in the parallel dehumidifying-heating mode functions as the merge portion that merges the refrigerant entering through the two inlets and allows the refrigerant to flow out through the one outlet.

A first outlet of the first three-way connector 13a is connected to a first refrigerant passage 14a that guides the refrigerant flowing out of the inside condenser 12 to the refrigerant inlet of the outside heat exchanger 16. A second outlet of the first three-way connector 13a is connected to a second refrigerant passage 14b that guides the refrigerant flowing out of the inside condenser 12 to an inlet of a second expansion valve 15b disposed in a third refrigerant passage 14c described later. More specifically, the second outlet of the first three-way connector 13a is connected to a first inlet of the third three-way connector 13c.

A first expansion valve 15a is disposed in the first refrigerant passage 14a. The first expansion valve 15a is a first decompression unit that decompresses the refrigerant flowing out of the inside condenser 12 at least in the heating mode. The first expansion valve 15a is a variable throttle mechanism that has a valve body with a variable throttle opening and an electric actuator including a stepping motor that changes the throttle opening of the valve body.

Moreover, the first expansion valve 15a is configured as the variable throttle mechanism with a fully open function that fully opens the throttle to simply function as a refrigerant passage while exerting little refrigerant decompression action. The operation of the first expansion valve 15a is controlled by a control signal output from the air conditioning controller 40. The control signal is, in other words, a control pulse.

The outlet of the first expansion valve 15a is connected to the refrigerant inlet of the outside heat exchanger 16. Thus, the refrigerant flowing out of the inside condenser 12 passes through the first expansion valve 15a and flows into the outside heat exchanger 16. The outside heat exchanger 16 allows heat exchange between the refrigerant and the outside air blown by a blower fan (not shown). The outside air is, in other words, the air outside the space to be air-conditioned such as the vehicle compartment. The outside heat exchanger 16 is disposed in a front area under the hood of the vehicle in a front-rear direction of the vehicle. The blower fan is an electric blower whose blowing capacity (such as the rotation speed) is controlled by a control voltage output from the air conditioning controller 40.

A refrigerant outlet of the outside heat exchanger 16 is connected to an inlet of the second three-way connector 13b. A first outlet of the second three-way connector 13b is connected to the third refrigerant passage 14c that guides the refrigerant flowing out of the outside heat exchanger 16 to a refrigerant inlet of the inside evaporator 18. A second outlet of the second three-way connector 13b is connected to a fourth refrigerant passage 14d that guides the refrigerant flowing out of the outside heat exchanger 16 to an inlet of an accumulator 20 described later. More specifically, the refrigerant flowing out of the second outlet of the second three-way connector 13b flows into the fourth three-way connector 13d through a first inlet of the fourth three-way connector 13d, and then flows into the inlet of the accumulator 20 through an outlet of the fourth three-way connector 13d.

In the third refrigerant passage 14c, a check valve 17, the third three-way connector 13c, and a second expansion valve 15b are disposed in this order with respect to the flow of the refrigerant. The check valve 17 allows the refrigerant to flow only from the second three-way connector 13b to the inside evaporator 18. The third three-way connector 13c is connected to the second refrigerant passage 14b described above.

The second expansion valve 15b is a second decompression unit that decompresses the refrigerant flowing out of the outside heat exchanger 16 and flowing into the inside evaporator 18. The basic configuration of the second expansion valve 15b is similar to that of the first expansion valve 15a. Furthermore, the second expansion valve 15b of the present embodiment includes a variable throttle mechanism with a fully closed function that closes the refrigerant passage when the throttle is fully closed.

Therefore, the refrigeration cycle system 10 of the present embodiment can switch the refrigerant circuit by fully closing the second expansion valve 15b to close the third refrigerant passage 14c. In other words, the second expansion valve 15b combines the function as the refrigerant decompression unit and the function as a refrigerant circuit switching unit that switches the refrigerant circuit of the refrigerant circulating in the cycle.

In each of the cooling mode, the series dehumidifying-heating mode, and the parallel dehumidifying-heating mode, the refrigerant flowing out of the outside heat exchanger 16 passes through the second expansion valve 15b and flows into the inside evaporator 18. The inside evaporator 18 is a cooling heat exchanger that allows heat exchange between the refrigerant and the air not having passed through the inside condenser 12. The inside evaporator 18 cools the air by causing the refrigerant decompressed in the second expansion valve 15b to evaporate and exert a heat absorbing action. The inside evaporator 18 is disposed upstream of the inside condenser 12 in the direction of the air flow in the casing 31 of the inside air conditioning unit 30.

A refrigerant outlet of the inside evaporator 18 is connected to an inlet of an evaporating pressure regulating valve 19. The evaporating pressure regulating valve 19 regulates a refrigerant evaporating pressure Pe in the inside evaporator 18 to be higher than or equal to a frost formation preventing pressure APe in order to prevent frost formation on the inside evaporator 18. In other words, the evaporating pressure regulating valve 19 regulates a refrigerant evaporating temperature Te in the inside evaporator 18 to be higher than or equal to a frost formation preventing temperature ATe.

The present embodiment adopts R134a as the refrigerant and sets the frost formation preventing temperature ATe to a value slightly higher than 0° C. Accordingly, the frost formation preventing pressure APe is set to a value slightly higher than 0.293 MPa which is the saturation pressure of R134a at 0° C.

An outlet of the evaporating pressure regulating valve 19 is connected to a second inlet of the fourth three-way connector 13d. The first outlet of the fourth three-way connector 13d is connected to the fourth refrigerant passage 14d described above. The outlet of the fourth three-way connector 13d is connected to the inlet of the accumulator 20.

The accumulator 20 is a gas-liquid separator that separates the refrigerant entering the accumulator into gas and liquid, and accumulates surplus refrigerant in the cycle. A gas-phase refrigerant outlet of the accumulator 20 is connected to an intake port of the compressor 11. The accumulator 20 thus prevents liquid-phase refrigerant from entering the compressor 11 to prevent liquid compression in the compressor 11.

A first on-off valve 21 is disposed in the fourth refrigerant passage 14d connecting the second three-way connector 13b and the fourth three-way connector 13d. The first on-off valve 21 is a refrigerant circuit switching unit that opens and closes the fourth refrigerant passage 14d to switch the refrigerant circuit through which the refrigerant is circulated. The first on-off valve 21 is, for example, a solenoid valve. The operation of the first on-off valve 21 is controlled by a control signal output from the air conditioning controller 40.

A second on-off valve 22 is disposed in the second refrigerant passage 14b connecting the first three-way connector 13a and the third three-way connector 13c. The second on-off valve 22 is a refrigerant circuit switching unit that opens and closes the second refrigerant passage 14b to switch the refrigerant circuit through which the refrigerant is circulated. The second on-off valve 22 is, for example, a solenoid valve. The basic configuration of the second on-off valve 22 is similar to that of the first on-off valve 21.

Next, the inside air conditioning unit 30 will be described. The inside air conditioning unit 30 blows the air, the temperature of which is regulated by the refrigeration cycle system 10, into the vehicle compartment as the space to be air-conditioned. The inside air conditioning unit 30 is disposed inside an instrument panel at the foremost part of the vehicle compartment. The inside air conditioning unit 30 houses a blower 32, the inside evaporator 18, the inside condenser 12, an auxiliary heater 70, and the like in the casing 31 that forms the outer shell of the inside air conditioning unit.

The casing 31 is an air passage forming portion that forms an air passage for the air blown into the vehicle compartment which is the space to be air-conditioned. The casing 31 is made of resin (such as polypropylene) having a certain degree of elasticity and excellent strength. An inside/outside air switching unit 33 as an inside/outside air switching portion that switchably introduces inside air and outside air into the casing 31 is disposed at the most upstream part in the direction of the air flow in the casing 31. The inside air is, in other words, the air inside the space to be air-conditioned (the vehicle compartment).

The inside/outside air switching unit 33 includes an inside air introduction port 33b for introducing the inside air into the casing 31 and an outside air introduction port 33c for introducing the outside air into the casing 31. Moreover, an inside/outside air switching door 33a is swingably provided in the inside/outside air switching unit 33. The inside/outside air switching door 33a is driven by an electric actuator, the operation of which is controlled by a control signal output from the air conditioning controller 40.

The inside/outside air switching unit 33 switches between an outside air mode and an inside air mode by the inside/outside air switching door 33a. The outside air mode is a mode in which the inside/outside air switching door 33a closes the inside air introduction port 33b and opens the outside air introduction port 33c so that the outside air which is the air outside the space to be air-conditioned is introduced into the casing 31. The inside air mode is a mode in which the inside/outside air switching door 33a closes the outside air introduction port 33c and opens the inside air introduction port 33b so that the inside air which is the air inside the space to be air-conditioned is introduced into the casing 31.

Moreover, the inside/outside air switching unit 33 uses the inside/outside air switching door 33a to continuously adjust the area of opening of each of the inside air introduction port 33b and the outside air introduction port 33c to be able to continuously change a ratio of the air volume of the inside air to the air volume of the outside air.

The blower 32 is disposed downstream of the inside/outside air switching unit 33 in the direction of the air flow, and blows the air drawn in through the inside/outside air switching unit 33 toward the space to be air-conditioned. The blower 32 is an electric blower that drives a multi-blade centrifugal fan (sirocco fan) with an electric motor, and the rotation speed (volume of air supplied) thereof is controlled by a control voltage output from the air conditioning controller 40.

The inside evaporator 18 is disposed downstream of the blower 32 in the direction of the air flow in the air passage formed inside the casing 31. Moreover, an inside condenser passage 35 and a cold air bypass passage 36 are formed in parallel in a bifurcated area downstream of the inside evaporator 18 in the air passage formed inside the casing 31.

The inside condenser 12 is disposed in the inside condenser passage 35. That is, the inside condenser passage 35 is a passage that allows passage of the air subjected to heat exchange with the refrigerant in the inside condenser 12. The inside evaporator 18 and the inside condenser 12 are disposed in this order with respect to the air flow. In other words, the inside evaporator 18 is disposed upstream of the inside condenser 12 in the direction of the air flow. The inside condenser passage 35 forms a part of a first air passage that allows the air to pass through the inside evaporator 18, the inside condenser 12, and the auxiliary heater 70 in this order.

The cold air bypass passage 36 is a passage that allows the air having passed through the inside evaporator 18 to flow downstream while bypassing the inside condenser 12. The cold air bypass passage 36 forms a part of a second air passage that allows the air to bypass the inside condenser 12 and pass through the inside evaporator 18 and the auxiliary heater 70 in this order.

An air mix door 34 is disposed downstream of the inside evaporator 18 and upstream of the inside condenser 12 in the direction of the air flow, and adjusts a ratio of the air allowed to pass through the inside condenser 12 after having passed through the inside evaporator 18 by a control signal output from the air conditioning controller 40.

A mixing passage 37 is formed downstream of a merge portion of the inside condenser passage 35 and the cold air bypass passage 36 in the casing 31. In the mixing passage 37, the air heated in the inside condenser 12 and the air passing through the cold air bypass passage 36 and not heated in the inside condenser 12 are mixed.

The auxiliary heater 70 for heating the air flowing through the mixing passage 37 is disposed in the mixing passage 37. The operation of the auxiliary heater 70 is controlled by a control signal output from a heating performance control unit 40d of the air conditioning controller 40 described later. In the present embodiment, the auxiliary heater 70 is an electric heater such as a PCT heater. A heater core that heats the air using the coolant of an internal combustion engine as a heat source may be adopted as the auxiliary heater 70.

Moreover, a plurality of openings is provided at the most downstream part of the casing 31 in the direction of the air flow and allows the air (conditioned air) mixed in a mixing space to be blown into the vehicle compartment which is the space to be air-conditioned.

Specifically, a face opening, a foot opening, and a defroster opening (none of which is shown) are provided as the openings. The face opening is the opening for blowing the conditioned air toward the upper body of a passenger in the vehicle compartment which is the space to be air-conditioned. The foot opening is the opening for blowing the conditioned air toward the feet of a passenger. The defroster opening is the opening for blowing the conditioned air toward an inner surface of a windshield.

Downstream of the face opening, the foot opening, and the defroster opening in the direction of the air flow are connected to a face vent, a foot vent, and a defroster vent (none of which is shown) provided in the vehicle compartment as the space to be air-conditioned via ducts forming the air passages, respectively.

Thus, the air mix door 34 adjusts the ratio of the volume of air passing through the inside condenser 12 and the volume of air passing through the cold air bypass passage 36, so that the temperature of the conditioned air mixed in the mixing space is adjusted and that the temperature of the conditioned air blown into the vehicle compartment as the space to be air-conditioned from each vent is adjusted.

In other words, the air mix door 34 functions as a temperature adjustment unit that adjusts the temperature of the conditioned air blown into the vehicle compartment which is the space to be air-conditioned. The air mix door 34 is driven by an electric actuator for driving the air mix door. The operation of the electric actuator is controlled by a control signal output from the air conditioning controller 40.

The air mix door 34 also serves as an air passage switching unit that switches the air passage to the first air passage allowing the air to pass through the inside evaporator 18, the inside condenser 12, and the auxiliary heater 70 in this order in the heating mode, the series dehumidifying-heating mode, and the parallel dehumidifying-heating mode, and switches the air passage to the second air passage allowing the air to bypass the inside condenser 12 and pass through the inside evaporator 18 and the auxiliary heater 70 in this order in the cooling mode and the defrosting mode.

A face door for adjusting the area of opening of the face opening, a foot door for adjusting the area of opening of the foot opening, and a defroster door for adjusting the area of opening of the defroster opening (none of which is shown) are disposed upstream of the face opening, the foot opening, and the defroster opening in the direction of the air flow, respectively.

The face door, the foot door, and the defroster door form a vent mode switching door for switching vent modes. The face door, the foot door, and the defroster door are each connected to an electric actuator for driving a door corresponding to the vent mode via a link mechanism or the like, and are turned in conjunction therewith. The operation of the electric actuator is also controlled by a control signal output from the air conditioning controller 40.

The vent modes switched by the vent mode switching door specifically include a face mode, a bi-level mode, a foot mode, and the like.

The face mode is the vent mode in which the face vent is fully opened to blow out the air therefrom toward the upper body of a passenger in the vehicle compartment. The bi-level mode is the vent mode in which both the face vent and the foot vent are opened to blow out the air toward the upper body and feet of a passenger in the vehicle compartment. The foot mode is the vent mode in which the foot vent is fully opened to blow out the air toward the feet of a passenger in the vehicle compartment.

Figure 2:
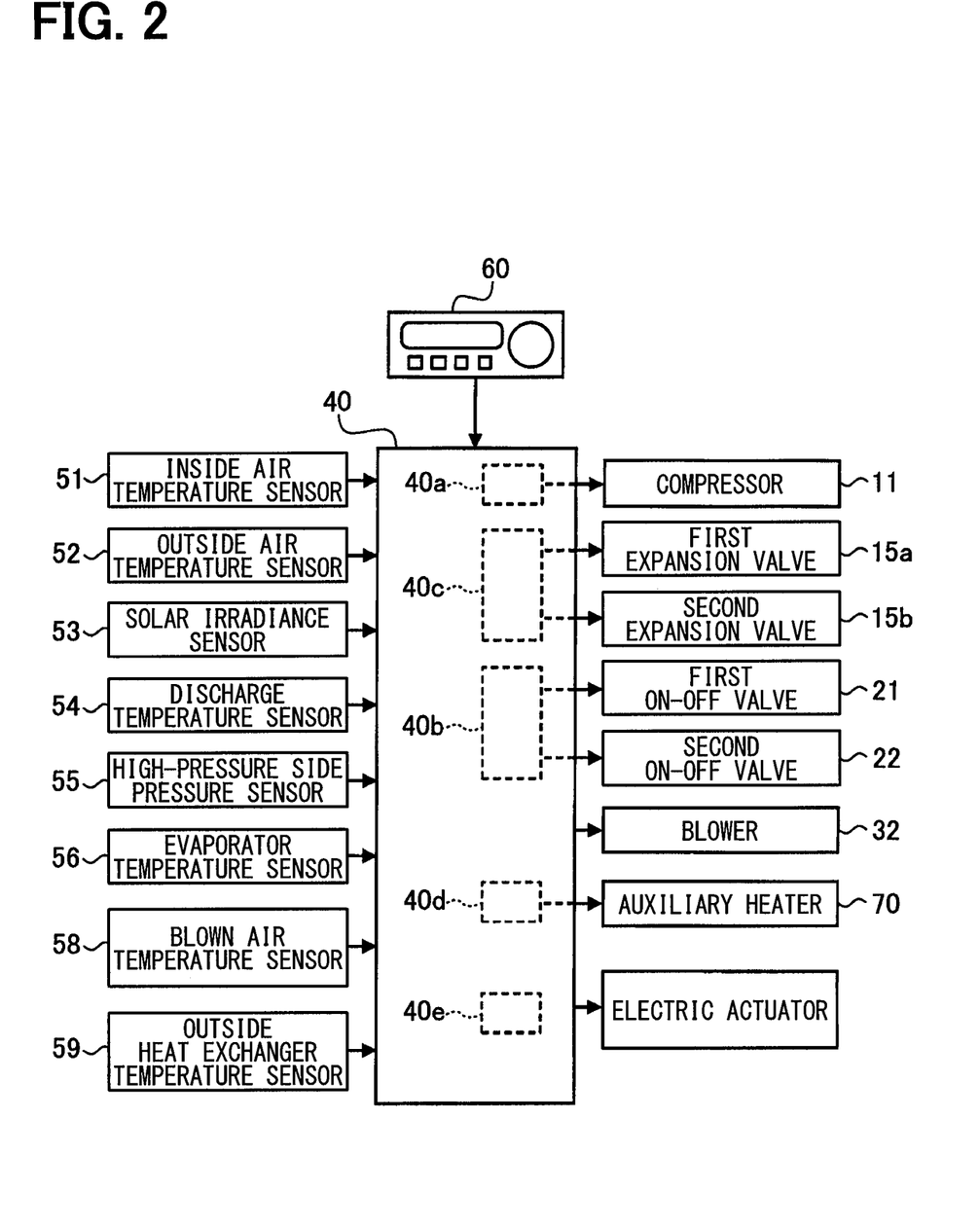
FIG. 2 is a block diagram illustrating an electric control unit of the air conditioner of at least one embodiment.

When a passenger manually operates a vent mode selector switch provided on an operation panel 60 illustrated in FIG. 2, the vent mode can also be switched to a defroster mode in which the defroster vent is fully opened to blow out the air therefrom toward the inner surface of the vehicle windshield.

Next, the electric control unit of the present embodiment will be described with reference to FIG. 2. The air conditioning controller 40 is formed of a well-known microcomputer including a CPU, a ROM, a RAM, and the like and a peripheral circuit thereof. The air conditioning controller 40 performs various calculations and processings on the basis of a control program stored in the ROM and controls the operation of air conditioning control devices connected on the output side including the compressor 11, the first expansion valve 15a, the second expansion valve 15b, the first on-off valve 21, the second on-off valve 22, the blower 32, the auxiliary heater 70, and the like.

Moreover, the air conditioning controller 40 receives, on the input side, detection signals from a group of sensors for air conditioning control such as an inside air temperature sensor 51, an outside air temperature sensor 52, a solar irradiance sensor 53, a discharge temperature sensor 54, a high-pressure side pressure sensor 55, an evaporator temperature sensor 56, an air temperature sensor 58, and an outside heat exchanger temperature sensor 59.

The inside air temperature sensor 51 is an inside air temperature detector that detects an inside air temperature Tr. The inside air temperature is the temperature of the inside air. The outside air temperature sensor 52 is an outside air temperature detector that detects an outside air temperature Tam. The outside air temperature is the temperature of the outside air. The solar irradiance sensor 53 is a solar radiation detector that detects an amount of solar radiation As entering the space to be air-conditioned. The discharge temperature sensor 54 is a discharge temperature detector that detects a discharge refrigerant temperature Td of the refrigerant discharged from the compressor 11.

The high-pressure side pressure sensor 55 is a high-pressure side pressure detector that detects a refrigerant pressure Pd (high-pressure side refrigerant pressure) at the outlet of the inside condenser 12. The refrigerant pressure Pd is a refrigerant pressure in the range from the outlet of the compressor 11 to the inlet of the first expansion valve 15a in the heating mode and the series dehumidifying-heating mode. In the parallel dehumidifying-heating mode, the refrigerant pressure Pd is a refrigerant pressure in the range from the outlet of the compressor 11 to the inlet of the first expansion valve 15a and the inlet of the second expansion valve 15b. In the cooling mode and the defrosting mode, the refrigerant pressure Pd is a refrigerant pressure in the range from the outlet of the compressor 11 to the inlet of the second expansion valve 15b.

The evaporator temperature sensor 56 is an evaporator temperature detector that detects a refrigerant evaporating temperature Te (evaporator temperature) of the inside evaporator 18. Although the evaporator temperature sensor 56 of the present embodiment detects the temperature of heat exchanger fins of the inside evaporator 18, a temperature detector that detects the temperature of another part of the inside evaporator 18 may be adopted as the evaporator temperature sensor 56. Alternatively, a temperature detector that directly detects the temperature of the refrigerant itself flowing through the inside evaporator 18 may be adopted.

The air temperature sensor 58 is an air temperature detector that detects an air temperature TAV which is the temperature of the air blown into the space to be air-conditioned from the mixing space. The outside heat exchanger temperature sensor 59 detects the temperature of the refrigerant flowing through the outside heat exchanger 16.

The air conditioning controller 40 also receives, on the input side, operation signals from various air conditioning operation switches provided on the operation panel 60 that is disposed near the instrument panel in the front part of the vehicle compartment. Specifically, the various air conditioning operation switches provided on the operation panel 60 include an auto switch, a cooling switch (or an A/C switch), an air volume setting switch, a temperature setting switch, the vent mode selector switch, and the like.

The auto switch is an input unit for setting or canceling automatic control operation of the air conditioner 1. The cooling switch is an input unit for requesting cooling of the space to be air-conditioned. The air volume setting switch is an input unit for manually setting the air volume of the blower 32. The temperature setting switch is an input unit for setting a set temperature in space to be air-conditioned Tset which is a target temperature in the space to be air-conditioned. The vent mode selector switch is an input unit for manually setting the vent mode.

The air conditioning controller 40 integrates control units (in other words, controllers) for controlling the various air conditioning control devices connected on the output side of the air conditioning controller 40. However, a configuration controlling the operation of each air conditioning control device such as hardware and software may form the control unit for controlling the operation of each air conditioning control device.

For example, in the present embodiment, a configuration for controlling the operation of the compressor 11 forms a discharge capacity control unit 40a in the air conditioning controller 40. In the air conditioning controller 40, a configuration for controlling the operation of the first on-off valve 21, the second on-off valve 22, and the like as the refrigerant circuit switching units forms a refrigerant circuit control unit 40*b*. In the air conditioning controller 40, a configuration for controlling the operation of the first expansion valve 15*a* as the first decompression unit and the second expansion valve 15*b* as the second decompression unit forms a decompression unit control unit 40*c*. In the air conditioning controller 40, a configuration for controlling the heating performance of the auxiliary heater 70 forms the heating performance control unit 40*d*.

The discharge capacity control unit 40*a*, the refrigerant circuit control unit 40*b*, the decompression unit control unit 40*c*, the heating performance control unit 40*d*, and the like may of course be configured separately from the air conditioning controller 40. The air conditioning controller 40 of the present embodiment further includes a frost formation determination unit 40*e* that determines whether or not frost is formed on the outside heat exchanger 16, or whether or not the air conditioner is under an operating condition where frost can be formed on the outside heat exchanger 16.

Next, the operation of the air conditioner 1 of the present embodiment will be described. The air conditioner 1 of the present embodiment can switch the operation mode among the heating mode, the cooling mode, the series dehumidifying-heating mode, the parallel dehumidifying-heating mode, and the defrosting mode. The operation mode is switched by execution of an air conditioning control program stored in advance in the air conditioning controller 40.

When the air conditioning control program is executed, the air conditioning controller 40 reads the detection signals from the group of sensors 51 to 58 for air conditioning control and the like, the operation signals from the operation panel 60, and the like. Next, on the basis of the detection signals and operation signals being read, the air conditioning controller 40 calculates a target blown air temperature TAO which is a target temperature of the air blown into the vehicle compartment as the space to be air-conditioned.

Specifically, the target blown air temperature TAO is calculated by the following formula F1.

$$TAO = Kset \times Tset - Kr \times Tr - Kam \times Tam - Ks \times As + C \quad (F1)$$

In the formula, "Tset" is the set temperature in space to be air-conditioned that is set by the temperature setting switch, "Tr" is the inside air temperature detected by the inside air temperature sensor 51, "Tam" is the outside air temperature detected by the outside air temperature sensor 52, and "As" is the amount of solar radiation detected by the solar irradiance sensor 53. Moreover, "Kset", "Kr", "Kam", and "Ks" are control gains, and "C" is a correction constant.

The air conditioning controller 40 then determines the operation mode using the target blown air temperature TAO. The operation in each operation mode will be described below.

(a) Heating Mode

In the heating mode, the air conditioning controller 40 performs control to open the first on-off valve 21, close the second on-off valve 22, bring the first expansion valve 15*a* into a throttled state to exert the decompression action, and bring the second expansion valve 15*b* into a fully closed state.

Thus, as indicated by the solid arrows in FIG. 1, in the heating mode, the vapor compression refrigeration cycle is formed in which the refrigerant is circulated through the compressor 11, the inside condenser 12, the first expansion valve 15*a*, the outside heat exchanger 16, (the first on-off valve 21,) the accumulator 20, and the compressor 11 in this order.

For example, the control signal to be output to the electric motor of the compressor 11 is determined as follows. First, on the basis of the target blown air temperature TAO, a target condenser pressure PCO in the inside condenser 12 is determined with reference to a control map stored in advance in the air conditioning controller 40. In the control map, the target condenser pressure PCO increases as the target blown air temperature TAO increases.

Then, on the basis of a deviation between the target condenser pressure PCO and the refrigerant pressure Pd detected by the high-pressure side pressure sensor 55, the control signal to be output to the electric motor of the compressor 11 is determined using a feedback control method such that the refrigerant pressure Pd approaches the target condenser pressure PCO.

The control signal to be output to the electric actuator for driving the air mix door is determined such that the air mix door 34 fully closes the cold air bypass passage 36 and allows the entire flow of the air having passed through the inside evaporator 18 to pass through the inside condenser passage 35.

The control signal to be output to the first expansion valve 15*a* is determined such that the degree of subcooling of the refrigerant flowing into the first expansion valve 15*a* approaches a target degree of subcooling. The target degree of subcooling is a value determined such that a coefficient of performance (COP) of the cycle takes the maximum value.

The control voltage to be output to the electric motor of the blower 32 is determined on the basis of the target blown air temperature TAO with reference to the control map stored in advance in the air conditioning controller 40. In the control map, the blown air volume is the maximum when the target blown air temperature TAO is in an extremely low temperature range (maximum cooling range) and an extremely high temperature range (maximum heating range).

Furthermore, the blown air volume is decreased as the target blown air temperature TAO increases from the extremely low temperature range to an intermediate temperature range and decreases from the extremely high temperature range to the intermediate temperature range. The blown air volume is the minimum when the target blown air temperature TAO is in the intermediate temperature range.

The control signal to be output to the electric actuator for the inside/outside air switching door 33*a* is determined on the basis of the target blown air temperature TAO with reference to the control map stored in advance in the air conditioning controller 40. In the control map, the mode is basically set to the outside air mode for introducing the outside air. When high heating performance is desired with the target blown air temperature TAO in the extremely high temperature range, the mode is set to the inside air mode for introducing the inside air.

The control signal to be output to the electric actuator for driving a door corresponding to the vent mode is determined on the basis of the target blown air temperature TAO with reference to the control map stored in advance in the air conditioning controller 40. In the control map, the vent mode is switched to the foot mode, the bi-level mode, and the face mode in this order as the target blown air temperature TAO decreases from a high temperature range to a low temperature range.

Therefore, in the refrigeration cycle system 10 in the heating mode, the high pressure refrigerant discharged from the compressor 11 flows into the inside condenser 12. With the air mix door 34 opening the inside condenser passage 35, the refrigerant having flowed into the inside condenser 12 exchanges heat with the air having been blown by the blower 32 and passed through the inside evaporator 18, and releases heat. The air is heated as a result.

Since the second on-off valve 22 is closed, the refrigerant flowing out of the inside condenser 12 flows to the first refrigerant passage 14a via the first three-way connector 13a, and is decompressed to be a low pressure refrigerant in the first expansion valve 15a. Then, the low pressure refrigerant obtained by the decompression in the first expansion valve 15a flows into the outside heat exchanger 16 and absorbs heat from the outside air blown by the blower fan.

With the first on-off valve 21 open and the second expansion valve 15b fully closed, the refrigerant flowing out of the outside heat exchanger 16 flows to the fourth refrigerant passage 14d via the second three-way connector 13b, and flows into the accumulator 20 via the fourth three-way connector 13d to be separated into gas and liquid. Then, the gas phase refrigerant obtained by the separation in the accumulator 20 is drawn into the compressor 11 through the intake port thereof and compressed again in the compressor 11.

When the air blown out of the casing 31 does not reach the target blown air temperature TAO with the heating performance of the inside condenser 12 alone in the heating mode, the heating performance control unit 40d operates the auxiliary heater 70 to perform feedback control on the auxiliary heater 70 such that the air blown out of the casing 31 reaches the target blown air temperature TAO on the basis of the air temperature TAV detected by the air temperature sensor 58.

As described above, in the heating mode, the vehicle compartment can be heated by blowing the air heated by at least one of the inside condenser 12 and the auxiliary heater 70 into the vehicle compartment which is the space to be air-conditioned.

(b) Cooling Mode

In the cooling mode, the air conditioning controller 40 performs control to close the first on-off valve 21, close the second on-off valve 22, bring the first expansion valve 15a into a fully open state, and bring the second expansion valve 15b into a throttled state.

Thus, as indicated by the hollow arrows in FIG. 1, in the cooling mode, the vapor compression refrigeration cycle is formed in which the refrigerant is circulated through the compressor 11, the inside condenser 12, (the first expansion valve 15a,) the outside heat exchanger 16, (the check valve 17,) the second expansion valve 15b, the inside evaporator 18, the evaporating pressure regulating valve 19, the accumulator 20, and the compressor 11 in this order.

For example, the control signal to be output to the electric motor of the compressor 11 is determined as follows. First, on the basis of the target blown air temperature TAO, a target evaporating temperature TEO in the inside evaporator 18 is determined with reference to a control map stored in advance in the air conditioning controller 40. In the control map, the target evaporating temperature TEO decreases as the target blown air temperature TAO decreases. Moreover, the target evaporating temperature TEO has a lower limit (2° C. in the present embodiment) in order to prevent frost formation on the inside evaporator 18.

Then, on the basis of a deviation between the target evaporating temperature TEO and the refrigerant evaporating temperature Te detected by the evaporator temperature sensor 56, the control signal to be output to the electric motor of the compressor 11 is determined using the feedback control method such that the refrigerant evaporating temperature Te approaches the target evaporating temperature TEO.

The control signal to be output to the electric actuator for driving the air mix door is controlled such that the passage is switched to the second air passage in which the air mix door 34 fully opens the cold air bypass passage 36 and allows the air having passed through the inside evaporator 18 to bypass the inside condenser 12 and pass through the inside evaporator 18 and the auxiliary heater 70 in this order. The signal is determined such that the entire flow of the air having passed through the inside evaporator 18 passes through the cold air bypass passage 36. In the cooling mode, the opening of the air mix door 34 may be controlled such that the air temperature TAV approaches the target blown air temperature TAO.

The control signal to be output to the second expansion valve 15b is determined such that the degree of subcooling of the refrigerant flowing into the second expansion valve 15b approaches a target degree of subcooling. The target degree of subcooling is a value determined such that a coefficient of performance (COP) of the cycle takes the maximum value.

The control voltage to be output to the electric motor of the blower 32 is determined in a manner similar to that for the heating mode. The control signal to be output to the electric actuator for the inside/outside air switching door 33a is determined in a manner similar to that for the heating mode. The control signal to be output to the electric actuator for driving a door corresponding to the vent mode is determined in a manner similar to that for the heating mode.

The heating performance control unit 40d stops the heating performance of the auxiliary heater 70.

Therefore, in the refrigeration cycle system 10 in the cooling mode, the high pressure refrigerant discharged from the compressor 11 flows into the inside condenser 12. At this time, the inside condenser passage 35 is fully closed by the air mix door 34 so that the refrigerant flowing into the inside condenser 12 flows out of the inside condenser 12 with little heat exchange with the air.

Since the second on-off valve 22 is closed, the refrigerant flowing out of the inside condenser 12 flows to the first refrigerant passage 14a via the first three-way connector 13a and flows into the first expansion valve 15a. At this time, with the first expansion valve 15a fully open, the refrigerant flowing out of the inside condenser 12 flows into the outside heat exchanger 16 without being decompressed in the first expansion valve 15a.

The refrigerant flowing into the outside heat exchanger 16 releases heat to the outside air blown by the blower fan in the outside heat exchanger 16. With the first on-off valve 21 being closed, the refrigerant flowing out of the outside heat exchanger 16 flows into the third refrigerant passage 14c via the second three-way connector 13b, and is decompressed to be the low pressure refrigerant in the second expansion valve 15b.

The low pressure refrigerant obtained by the decompression in the second expansion valve 15b flows into the inside evaporator 18 and absorbs heat from the air blown by the blower 32 to evaporate. The air is cooled as a result. The refrigerant flowing out of the inside evaporator 18 flows into the accumulator 20 via the evaporating pressure regulating valve 19 and is separated into gas and liquid. Then, the gas phase refrigerant obtained by the separation in the accumulator 20 is drawn into the compressor 11 through the intake port thereof and compressed again in the compressor 11.

As described above, in the cooling mode, the vehicle compartment can be cooled by blowing the air cooled in the inside evaporator 18 into the vehicle compartment which is the space to be air-conditioned.

(c) Series Dehumidifying-Heating Mode

In the series dehumidifying-heating mode, the air conditioning controller 40 performs control to close the first on-off valve 21, close the second on-off valve 22, bring the first expansion valve 15a into a throttled state, and bring the second expansion valve 15b into a throttled state. The air conditioning controller 40 further performs control to change the position of the air mix door 34 such that the inside condenser passage 35 is fully opened and the cold air bypass passage 36 is fully closed.

Thus, as indicated by the hollow arrows in FIG. 1, in the refrigeration cycle system 10 in the series dehumidifying-heating mode, the vapor compression refrigeration cycle is formed in which the refrigerant is circulated through the compressor 11, the inside condenser 12, the first expansion valve 15a, the outside heat exchanger 16, the check valve 17, the second expansion valve 15b, the inside evaporator 18, the evaporating pressure regulating valve 19, the accumulator 20, and the compressor 11 in this order. That is, the refrigeration cycle is formed in which the outside heat exchanger 16 and the inside evaporator 18 are connected in series with respect to the refrigerant flow.

With this cycle configuration, the air conditioning controller 40 controls the operation of the compressor 11 as in the cooling mode.

The air conditioning controller 40 also controls the operation of the first expansion valve 15a and the second expansion valve 15b on the basis of the target blown air temperature TAO or the like with reference to the control map stored in advance in the air conditioning controller 40 such that the coefficient of performance COPr of the cycle approaches the maximum value. More specifically, the air conditioning controller performs control to reduce the throttle opening of the first expansion valve 15a and increase the throttle opening of the second expansion valve 15b as the target blown air temperature TAO increases.

Accordingly, in the refrigeration cycle system 10 in the series dehumidifying-heating mode, the refrigeration cycle is formed in which the inside condenser 12 functions as a radiator and the inside evaporator 18 functions as an evaporator. Moreover, the outside heat exchanger 16 functions as a radiator when the saturation temperature of the refrigerant in the outside heat exchanger 16 is higher than the outside air temperature Tam, or functions as an evaporator when the saturation temperature of the refrigerant in the outside heat exchanger 16 is lower than the outside air temperature Tam.

When the saturation temperature of the refrigerant in the outside heat exchanger 16 is higher than the outside air temperature Tam, the amount of heat released from the refrigerant in the outside heat exchanger 16 can be reduced by decreasing the saturation temperature of the refrigerant in the outside heat exchanger 16 as the target blown air temperature TAO increases. As a result, the amount of heat released from the refrigerant in the inside condenser 12 can be increased to improve the heating performance.

When the saturation temperature of the refrigerant in the outside heat exchanger 16 is lower than the outside air temperature Tam, the amount of heat absorbed by the refrigerant in the outside heat exchanger 16 can be increased by decreasing the saturation temperature of the refrigerant in the outside heat exchanger 16 as the target blown air temperature TAO increases. As a result, the amount of heat released from the refrigerant in the inside condenser 12 can be increased to improve the heating performance.

When the air blown out of the casing 31 does not reach the target blown air temperature TAO by the heating performance of the inside condenser 12 alone in the series dehumidifying-heating mode, the heating performance control unit 40d operates the auxiliary heater 70 to perform feedback control on the auxiliary heater 70 such that the air blown out of the casing 31 reaches the target blown air temperature TAO on the basis of the air temperature TAV detected by the air temperature sensor 58.

Therefore, in the series dehumidifying-heating mode, the vehicle compartment can be dehumidified and heated by reheating the air cooled and dehumidified in the inside evaporator 18 in the inside condenser 12 and the auxiliary heater 70, and blowing the reheated air into the vehicle compartment which is the space to be air-conditioned. Moreover, the air heating performance in the inside condenser 12 can be adjusted by adjusting the throttle openings of the first expansion valve 15a and the second expansion valve 15b.

(d) Parallel Dehumidifying-Heating Mode

In the parallel dehumidifying-heating mode, the air conditioning controller 40 performs control to open the first on-off valve 21, open the second on-off valve 22, bring the first expansion valve 15a into a throttled state, and bring the second expansion valve 15b into a throttled state.

Thus, as indicated by the hatched arrows in FIG. 1, in the parallel dehumidifying-heating mode, the vapor compression refrigeration cycle is formed in which the refrigerant is circulated through the compressor 11, the inside condenser 12, the first expansion valve 15a, the outside heat exchanger 16, (the first on-off valve 21,) the accumulator 20, and the compressor 11 in this order and at the same time the refrigerant is circulated through the compressor 11, the inside condenser 12, (the second on-off valve 22,) the second expansion valve 15b, the inside evaporator 18, the evaporating pressure regulating valve 19, the accumulator 20, and the compressor 11 in this order.

That is, the parallel dehumidifying-heating mode performs switching to the refrigerant circuit in which the flow of the refrigerant flowing out of the inside condenser 12 is branched off at the first three-way connector 13a, so that the refrigerant in one branch flows through the first expansion valve 15a, the outside heat exchanger 16, and the compressor 11 in this order while the refrigerant in another branch flows through the second expansion valve 15b, the inside evaporator 18, the evaporating pressure regulating valve 19, and the compressor 11 in this order.

For example, the control signal to be output to the electric motor of the compressor 11 is determined in a manner similar to that for the heating mode. The control signal to be output to the electric actuator for driving the air mix door is determined such that, as with the heating mode, the air mix door 34 fully closes the cold air bypass passage 36 and allows the entire flow of the air having passed through the inside evaporator 18 to pass through the inside condenser passage 35.

The control signals to be output to the first expansion valve 15a and the second expansion valve 15b are determined such that frost formation on the inside evaporator 18 is prevented.

The control voltage to be output to the electric motor of the blower 32 is determined in a manner similar to that for the heating mode. The control signal to be output to the electric actuator for the inside/outside air switching door 33a is determined in a manner similar to that for the heating mode. The control signal to be output to the electric actuator for driving a door corresponding to the vent mode is determined in a manner similar to that for the heating mode.

Therefore, in the refrigeration cycle system 10 in the parallel dehumidifying-heating mode, the high pressure refrigerant discharged from the compressor 11 flows into the inside condenser 12. With the air mix door 34 opening the inside condenser passage 35, as in the heating mode, the refrigerant having flowed into the inside condenser 12 exchanges heat with the air having been blown by the blower 32 and passed through the inside evaporator 18, and releases heat. The air is heated as a result.

The flow of the refrigerant flowing out of the inside condenser 12 is branched off at the first three-way connector 13a since the second on-off valve 22 is open. One portion of the refrigerant branched off at the first three-way connector 13a flows out to the first refrigerant passage 14a and is decompressed to be the low pressure refrigerant in the first expansion valve 15a. The low pressure refrigerant obtained by the decompression in the first expansion valve 15a flows into the outside heat exchanger 16 and absorbs heat from the outside air blown by the blower fan.

On the other hand, another portion of the refrigerant branched off at the first three-way connector 13a flows out to the second refrigerant passage 14b. The refrigerant flowing out to the second refrigerant passage 14b does not flow out to the outside heat exchanger 16 due to the action of the check valve 17, and flows into the second expansion valve 15b via the second on-off valve 22 and the third three-way connector 13c.

The refrigerant flowing into the second expansion valve 15b is decompressed to be the low pressure refrigerant. The low pressure refrigerant obtained by the decompression in the second expansion valve 15b flows into the inside evaporator 18 to absorb heat from the air blown by the blower 32 and evaporate. The air is cooled as a result. The refrigerant flowing out of the inside evaporator 18 is decompressed in the evaporating pressure regulating valve 19 to have a pressure equivalent to that of the refrigerant flowing out of the outside heat exchanger 16.

The refrigerant flowing out of the evaporating pressure regulating valve 19 flows into the fourth three-way connector 13d and joins with the refrigerant flowing out of the outside heat exchanger 16. The refrigerant joined at the fourth three-way connector 13d flows into the accumulator 20 and is separated into gas and liquid. Then, the gas phase refrigerant obtained by the separation in the accumulator 20 is drawn into the compressor 11 through the intake port thereof and compressed again in the compressor 11.

When the air blown out of the casing 31 does not reach the target blown air temperature TAO by the heating performance of the inside condenser 12 alone in the parallel dehumidifying-heating mode, the heating performance control unit 40d operates the auxiliary heater 70 to perform feedback control on the auxiliary heater 70 such that the air blown out of the casing 31 reaches the target blown air temperature TAO on the basis of the air temperature TAV detected by the air temperature sensor 58.

As described above, in the parallel dehumidifying-heating mode, the vehicle compartment can be dehumidified and heated by reheating the air cooled and dehumidified in the inside evaporator 18 in the inside condenser 12 and the auxiliary heater 70, and blowing the reheated air into the vehicle compartment which is the space to be air-conditioned.

Moreover, in the parallel dehumidifying-heating mode of the present embodiment, the refrigerant evaporating temperature in the outside heat exchanger 16 can be lower than the refrigerant evaporating temperature in the inside evaporator 18. As a result, the temperature difference between the refrigerant evaporating temperature and the outside air in the outside heat exchanger 16 can be increased to increase the amount of heat absorbed in the outside heat exchanger 16.

Therefore, the air heating performance in the inside condenser 12 can be higher than the refrigeration cycle system in which the refrigerant evaporating temperature in the outside heat exchanger 16 is equivalent to the refrigerant evaporating temperature in the inside evaporator 18.

(e) Defrosting Mode

The following defrosting mode is executed when the frost formation determination unit 40e of the air conditioning controller 40 determines that frost is formed on the outside heat exchanger 16. For example, the frost formation determination unit 40e determines that frost is formed on the outside heat exchanger 16 when, for example, the outside air temperature Tam detected by the outside air temperature sensor 52 is 0° C. or lower and a value obtained by subtracting the temperature of the outside heat exchanger 16 detected by the outside heat exchanger temperature sensor 59 from the outside air temperature Tam is equal to a predetermined reference temperature difference or larger.

In the defrosting mode, the air conditioning controller 40 performs control to close the first on-off valve 21, close the second on-off valve 22, bring the first expansion valve 15a into a fully open state, and bring the second expansion valve 15b into a throttled state.

Thus, as indicated by the hollow arrows in FIG. 1, in the defrosting mode, the vapor compression refrigeration cycle is formed in which the refrigerant is circulated through the compressor 11, the inside condenser 12, (the first expansion valve 15a,) the outside heat exchanger 16, (the check valve 17,) the second expansion valve 15b, the inside evaporator 18, the evaporating pressure regulating valve 19, the accumulator 20, and the compressor 11 in this order.

The inside/outside air switching unit 33 performs switching to the inside air mode. As a result, the air in the space to be air-conditioned is introduced into the casing 31. The control signal to be output to the electric actuator for the air mix door 34 is determined such that the air mix door 34 fully opens the cold air bypass passage 36 and allows the entire flow of the air having passed through the inside evaporator 18 to pass through the cold air bypass passage 36.

Therefore, in the refrigeration cycle system 10 in the defrosting mode, the high pressure refrigerant discharged from the compressor 11 flows into the inside condenser 12. At this time, the inside condenser passage 35 is fully closed by the air mix door 34 so that the refrigerant flowing into the inside condenser 12 flows out of the inside condenser 12 with little heat exchange with the air.

Moreover, the heating performance control unit 40d operates the auxiliary heater 70 to perform feedback control on the auxiliary heater 70 such that the air blown out of the casing 31 reaches the target blown air temperature TAO on the basis of the air temperature TAV detected by the air temperature sensor 58. As a result, the air having passed through the cold air bypass passage 36 is heated in the auxiliary heater 70. The heated air is then blown into the vehicle compartment which is the space to be air-conditioned, thereby preventing a decrease in the temperature of the vehicle compartment in the defrosting mode.

Note that while the air flowing into the auxiliary heater 70 is heated in the inside condenser 12 in the heating mode, the air flowing into the auxiliary heater 70 in the defrosting mode is cooled by the inside evaporator 18. Accordingly, the heating performance control unit 40d sets the heating performance of the auxiliary heater 70 to be higher in the defrosting mode than in the heating mode.

Since the second on-off valve 22 is closed, the refrigerant flowing out of the inside condenser 12 flows to the first refrigerant passage 14a via the first three-way connector 13a and flows into the first expansion valve 15a. At this time, with the first expansion valve 15a fully open, the refrigerant flowing out of the inside condenser 12 flows into the outside heat exchanger 16 without being decompressed in the first expansion valve 15a.

The refrigerant flowing into the outside heat exchanger 16 releases heat to the outside air blown by the blower fan in the outside heat exchanger 16. With the first on-off valve 21 being closed, the refrigerant flowing out of the outside heat exchanger 16 flows into the third refrigerant passage 14c via the second three-way connector 13b, and is decompressed to be the low pressure refrigerant in the second expansion valve 15b.

The low pressure refrigerant obtained by the decompression in the second expansion valve 15b flows into the inside evaporator 18 and absorbs heat from the air blown by the blower 32 to evaporate. The air is cooled as a result. The refrigerant flowing out of the inside evaporator 18 flows into the accumulator 20 via the evaporating pressure regulating valve 19 and is separated into gas and liquid. Then, the gas phase refrigerant obtained by the separation in the accumulator 20 is drawn into the compressor 11 through the intake port thereof and compressed again in the compressor 11.

As described above, the inside condenser passage 35 is fully closed by the air mix door 34 so that the refrigerant flowing into the inside condenser 12 flows out of the inside condenser 12 with little heat exchange with the air. Thus, the refrigerant having absorbed heat through heat exchange with the air blown by the blower 32 in the inside evaporator 18 is supplied to the outside heat exchanger 16 without a temperature drop in the inside condenser 12. As a result, the frost adhering to the outside heat exchanger 16 melts and is removed from the outside heat exchanger 16.

Therefore, the air conditioner 1 of the present embodiment can achieve proper air conditioning of the vehicle compartment which is the space to be air-conditioned by switching the operation among the heating mode, the cooling mode, the series dehumidifying-heating mode, the parallel dehumidifying-heating mode, and the defrosting mode.

As described above, the air conditioner 1 has the auxiliary heater 70 for heating the air and, in the defrosting mode, performs switching to the refrigerant circuit in which the refrigerant releasing heat in the outside heat exchanger 16 is decompressed and evaporated in the inside evaporator 18. Moreover, in the defrosting mode, the air mix door 34 switches the passage to the second air passage that allows the air to bypass the inside condenser 12 and pass through the inside evaporator 18 and the auxiliary heater 70 in this order.

As a result, the air passing through the inside evaporator 18 and cooled in the inside evaporator 18 can be heated in the auxiliary heater 70 and blown into the vehicle compartment which is the space to be air-conditioned being heated, thereby being able to prevent a decrease in the temperature of the vehicle compartment in the defrosting mode. As a result, a decrease in the heating performance of the air conditioner 1 can be prevented even during the defrosting operation of the outside heat exchanger 16.

In the heating mode, the air mix door 34 switches the passage to the first air passage that allows the air to pass through the inside evaporator 18, the inside condenser 12, and the auxiliary heater 70 in this order. As a result, when the air blown out of the casing 31 does not reach the target blown air temperature TAO by the heating performance of the inside condenser 12 alone, the auxiliary heater 70 is brought into operation to allow the air blown out of the casing 31 to reach the target blown air temperature TAO.

Moreover, the heating performance control unit 40d sets the heating performance of the auxiliary heater 70 to be higher in the defrosting mode than in the heating mode. The air can thus be heated sufficiently in the auxiliary heater 70 even when the air cannot be heated in the inside condenser 12 in the defrosting mode. The air sufficiently heated in the auxiliary heater 70 is blown into the vehicle compartment to be able to reliably prevent a decrease in the temperature of the vehicle compartment in the defrosting mode.

The heating performance control unit 40d stops the heating performance of the auxiliary heater 70 in the cooling mode. As a result, wasteful heating of the air by the auxiliary heater 70 in the cooling mode is prevented, and wasteful consumption of electric energy is prevented in a case where the auxiliary heater 70 is an electric heater. Moreover, it is prevented that with the air being heated by the auxiliary heater 70, the air temperature TAV exceeds the target blown air temperature TAO.

In the defrosting mode, the inside/outside air switching unit 33 performs switching to the inside air mode. As a result, the outside air lower in temperature than the space to be air-conditioned does not enter the space to be air-conditioned in the defrosting mode. Thus, the air exchanging heat with the inside evaporator 18 is not decreased in temperature so that the refrigerant flowing through the inside evaporator 18 effectively exchanges heat with the air blown by the blower 32 to effectively absorb heat. As a result, the frost adhering to the outside heat exchanger 16 melts and is removed from the outside heat exchanger 16 in a shorter time.

Second Embodiment

An air conditioner 2 of a second embodiment will be described with reference to FIG. 3 in terms of differences from the air conditioner 1 of the first embodiment described above.

Figure 3:
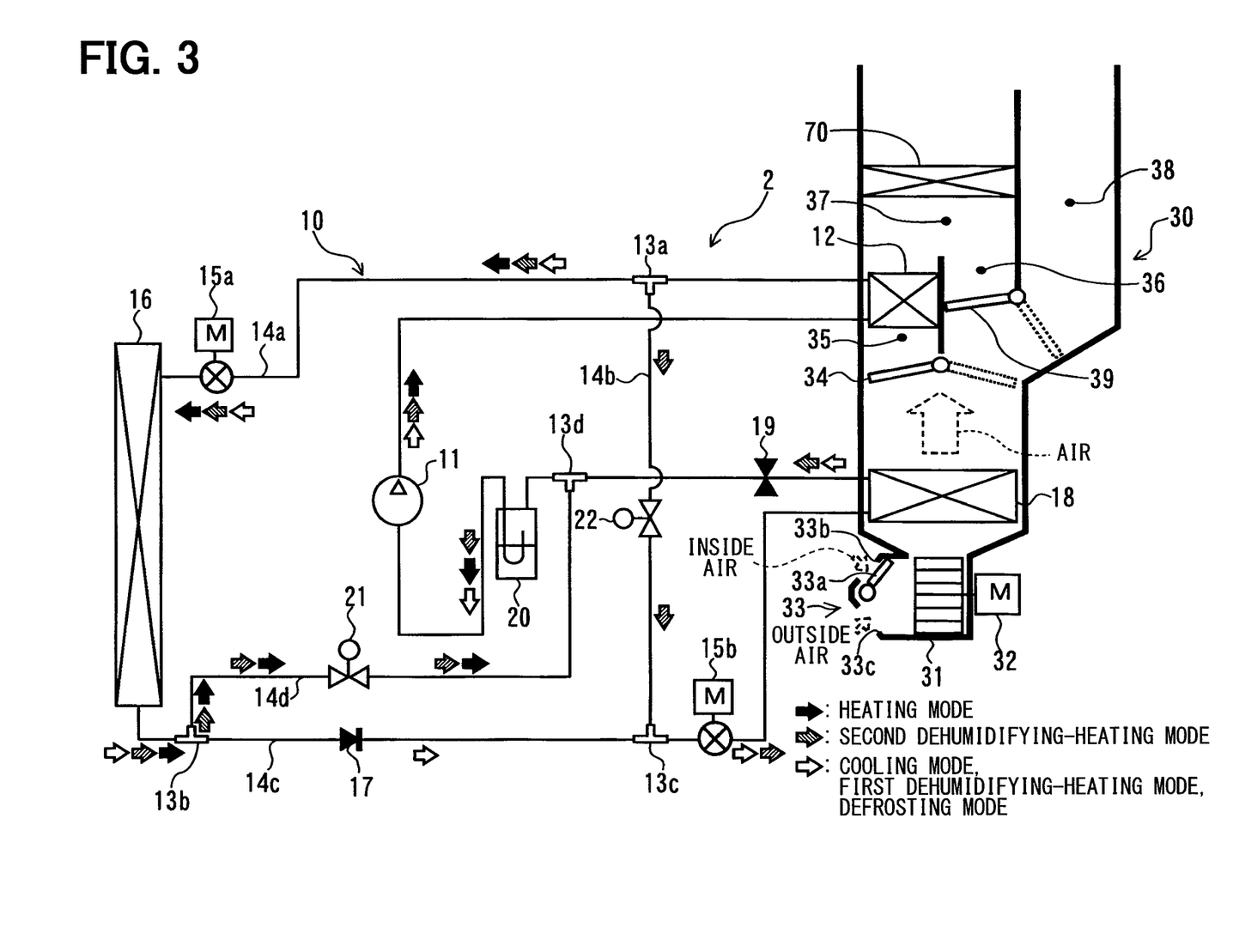
FIG. 3 is an overall configuration diagram of an air conditioner according to at least one embodiment.

In the air conditioner 2 of the second embodiment, as illustrated in FIG. 3, a third air passage 38 is formed in the casing 31 and an air passage switching door 39 as an air passage switching unit is provided therein. The third air passage 38 is formed in parallel with the cold air bypass passage 36 with an inlet thereof branching off from the inlet portion of the cold air bypass passage 36 and an outlet thereof joining the downstream of the auxiliary heater 70.

The air passage switching door 39 is swingably provided in the casing 31 at the inlet of the third air passage 38. According to a control signal output from the air conditioning controller 40, the air passage switching door 39 closes the inlet of the third air passage 38 and opens a mid-portion of the cold air bypass passage 36 as indicated by the broken line in FIG. 3, or opens the inlet of the third air passage 38 and closes the mid-portion of the cold air bypass passage 36 as indicated by the solid line in FIG. 3.

In the cooling mode, as illustrated in FIG. 3, the air conditioner 2 of the second embodiment switches the air passage to a third air passage in which the air mix door 34 fully opens the inlet of the cold air bypass passage 36 while the air passage switching door 39 opens the inlet of the third air passage 38, thereby allowing the air flowing through the inside evaporator 18 to bypass the inside condenser 12 and the auxiliary heater 70.

Thus, in the cooling mode, an increase in ventilation resistance due to the passage of the air, which has flowed through the inside evaporator 18, through the auxiliary heater 70 can be prevented, and ventilation resistance of the passage allowing passage of the air having flowed through the inside evaporator 18 can be reduced in the cooling mode. As a result, the power consumption of the electric motor of the blower 32 can be reduced.

Third Embodiment

An air conditioner 3 of a third embodiment will be described with reference to FIG. 4 in terms of differences from the air conditioner 1 of the first embodiment described above.

Figure 4:
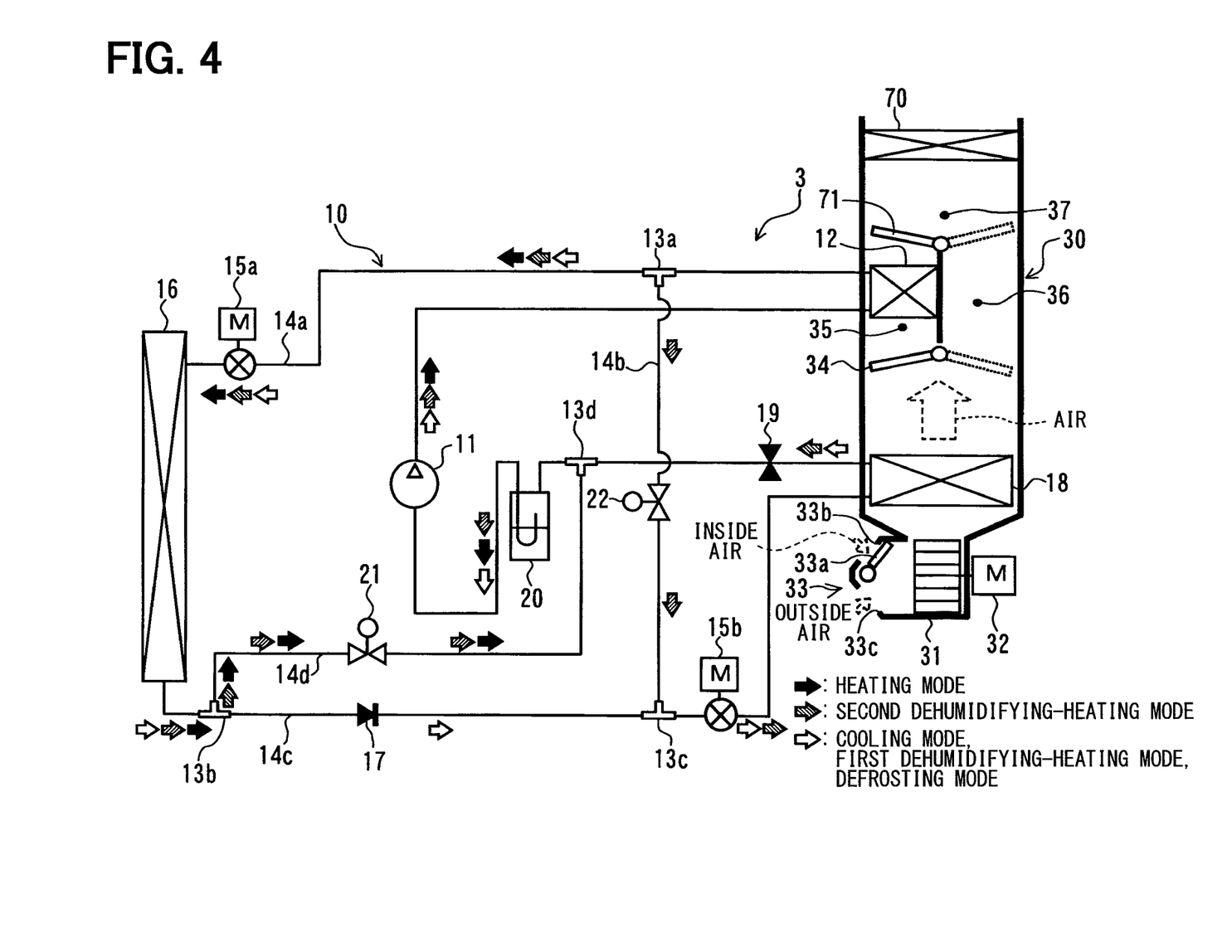
FIG. 4 is an overall configuration diagram of an air conditioner according to at least one embodiment.

In the air conditioner 3 of the third embodiment, as illustrated in FIG. 4, an air guide door 71 is provided in the casing 31 upstream of the auxiliary heater 70 where the inside condenser passage 35 and the cold air bypass passage 36 join together. The air guide door 71 is a guide unit for guiding the air flowing out of either one of the inside condenser passage 35 and the cold air bypass passage 36 to the auxiliary heater 70. According to a control signal output from the air conditioning controller 40, the air guide door 71 closes the outlet of the inside condenser passage 35 and guides the air flowing through the cold air bypass passage 36 to the entire surface of the auxiliary heater 70 (as indicated by the solid line in FIG. 4), or closes the outlet of the cold air bypass passage 36 and guides the air flowing through the inside condenser passage 35 to the entire surface of the auxiliary heater 70 (as indicated by the broken line in FIG. 4).

In the defrosting mode, the air guide door 71 closes the outlet of the inside condenser passage 35 and guides the air flowing through the cold air bypass passage 36 to the entire surface of the auxiliary heater 70 (as indicated by the solid line in FIG. 4). On the other hand, in the heating mode, the series dehumidifying-heating mode, and the parallel dehumidifying-heating mode, the air guide door 71 closes the outlet of the cold air bypass passage 36 and guides the air flowing through the inside condenser passage 35 to the entire surface of the auxiliary heater 70 (as indicated by the broken line in FIG. 4).

The air is guided to the entire surface of the auxiliary heater 70 and is thus heated effectively by the auxiliary heater 70 as compared with the case where the air passes through a part of the auxiliary heater 70. Therefore, the air blown out of the casing 31 can be reliably heated to the target blown air temperature TAO. Moreover, in the case where the auxiliary heater 70 is an electric heater, the power consumption of the auxiliary heater 70 can be reduced, or the size of the auxiliary heater 70 can be reduced.

Other Embodiments

The present disclosure is not limited to the above embodiments but can be modified in various manners as follows without departing from the spirit of the present disclosure.

Although the above embodiments have described the examples of applying the air conditioner according to the present disclosure to a vehicle, the present disclosure may be applied not just to the air conditioner for a vehicle but to a stationary air conditioner.

The components making up the refrigeration cycle system 10 are not limited to those disclosed in the above embodiments. For example, although the above embodiments have described the examples of adopting the electric compressor as the compressor 11, when applied to a vehicle driving engine, the compressor 11 may be an engine-driven compressor that is driven by rotational driving force transmitted from the vehicle driving engine via a pulley, a belt, and the like.

Moreover, the technical features disclosed in the above embodiments may be combined as appropriate within the feasible range. For example, the air conditioner may be a combination of the air conditioner 2 of the second embodiment and the air conditioner 3 of the third embodiment.

What is claimed is:

1. An air conditioner comprising:
a compressor configured to compress and discharge a refrigerant;
an inside condenser configured to exchange heat between the refrigerant that was discharged from the compressor and an air that is to be conveyed to an air-conditioning target space;
an outside heat exchanger configured to exchange heat between the refrigerant that flows out of the inside condenser and an outside air;
an inside evaporator configured to exchange heat between the refrigerant that flows out of the outside heat exchanger and the air such that the refrigerant evaporates;
a refrigerant circuit switcher configured to switch a refrigerant circuit between a heating circuit and a defrosting circuit;
an auxiliary heater configured to heat the air;
an air passage forming portion defines an air passage through which the air flows, the air passage including a first passage and a second passage;
an air passage switcher configured to switch the air passage; and
a heating performance controller configured to control a heating performance of the auxiliary heater, wherein
the inside condenser, the inside evaporator, and the auxiliary heater are disposed in the air passage,
the inside condenser is disposed in the first passage,
the auxiliary heater is located downstream of the first passage and the second passage to heat the air that flows out of the first passage and the air that flows out of the second passage,
the refrigerant circuit switcher is configured to switch the refrigerant circuit to:
the heating circuit during a heating mode for heating the air-conditioning target space such that the refrigerant releases heat at the inside condenser and is decompressed to evaporate at the outside heat exchanger; and
the defrosting circuit during a defrosting mode for defrosting the outside heat exchanger such that the refrigerant releases heat at the outside heat exchanger and is decompressed to evaporate at the inside evaporator,
the air passage switcher is configured to switch the air passage to:
the first passage during the heating mode such that the air passes through the inside evaporator, the inside condenser, and the auxiliary heater in this order; and
the second passage during the defrosting mode such that the air bypasses the inside condenser and passes through the inside evaporator and the auxiliary heater in this order, and
the heating performance controller is configured to control the heating performance of the auxiliary heater in the defrosting mode to be higher than the heating performance of the auxiliary heater in the heating mode.

2. The air conditioner according to claim 1, wherein
the air passage switcher is configured to switch the air passage to the first passage during the heating mode such that the air passes through the inside evaporator, the inside condenser, and the auxiliary heater in this order.

3. The air conditioner according to claim 2, wherein
the air passage forming portion defines:
an inside condenser passage through which the air exchanging heat with the refrigerant at the inside condenser flows; and
a cold air bypass passage through which the air bypassing the inside condenser flows,
the air passage switcher includes a guiding portion configured to selectively guide the air flowing out of the inside condenser passage or the air flowing out of the cold air bypass passage toward the auxiliary heater.

4. The air conditioner according to claim 1,
wherein
the refrigerant circuit switcher is configured to switch the refrigerant circuit to the defrosting circuit during a cooling mode for cooling the air-conditioning target space such that the refrigerant releases heat at the outside heat exchanger and is decompressed to evaporate at the inside evaporator,
the air passage switcher is configured to switch the air passage to the second passage during the cooling mode, and
the heating performance controller is configured to stop a heating by the auxiliary heater during the cooling mode.

5. The air conditioner according to claim 1, further comprising:
an inside-outside air switcher configured to switch between an outside air mode for introducing the outside air into the air passage and an inside air mode for introducing an inside air in the air-conditioning target space into the air passage, wherein
the inside-outside air switcher is configured to switch to the inside air mode during the defrosting mode.

6. The air conditioner according to claim 1, wherein
the refrigerant circuit switcher is configured to switch the refrigerant circuit to the defrosting circuit during a cooling mode for cooling the air-conditioning target space such that the refrigerant releases heat at the outside heat exchanger and is decompressed to evaporate at the inside evaporator,
the air passage further includes a third passage, and
the air passage switcher is configured to switch the air passage to the third passage during the cooling mode such that the air flows through the inside evaporator and bypasses the inside condenser and the auxiliary heater.

7. An air conditioning system comprising:
a compressor configured to compress and discharge a refrigerant;
an inside condenser configured to exchange heat between the refrigerant that was discharged from the compressor and an air that is to be conveyed to an air-conditioning target space;
an outside heat exchanger configured to exchange heat between the refrigerant that flows out of the inside condenser and an outside air;
an inside evaporator configured to exchange heat between the refrigerant that flows out of the outside heat exchanger and the air such that the refrigerant evaporates;
a refrigerant circuit switcher configured to switch a refrigerant circuit between a heating circuit and a defrosting circuit;
an auxiliary heater configured to heat the air, the auxiliary heater, the inside condenser, and the inside evaporator being disposed in an air passage;
an air passage forming portion defines the air passage through which the air flows, the air passage including a first passage and a second passage;
an air passage switcher configured to switch the air passage between the first passage and the second passage;
one or more processors;
a memory coupled to the one or more processors and storing program instructions that when executed by the one or more processors cause the one or more processors to at least:
control the refrigerant circuit switcher to switch the refrigerant circuit to:
the heating circuit during a heating mode for heating the air-conditioning target space such that the refrigerant releases heat at the inside condenser and is decompressed to evaporate at the outside heat exchanger; and
the defrosting circuit during a defrosting mode for defrosting the outside heat exchanger such that the refrigerant releases heat at the outside heat exchanger and is decompressed to evaporate at the inside evaporator; and
control the air passage switcher to switch the air passage to:
the first passage during the heating mode such that the air passes through the inside evaporator, the inside condenser, and the auxiliary heater in this order; and
the second passage during the defrosting mode such that the air bypasses the inside condenser and passes through the inside evaporator and the auxiliary heater in this order; and
a heating performance controller configured to control a heating performance of the auxiliary heater, wherein
the heating performance controller is configured to control the heating performance of the auxiliary heater in the defrosting mode to be higher than the heating performance of the auxiliary heater in the heating mode.

8. An air-conditioning controller for controlling an air conditioner that includes:
a compressor configured to compress and discharge a refrigerant;
an inside condenser configured to exchange heat between the refrigerant that was discharged from the compressor and an air that is to be conveyed to an air-conditioning target space;
an outside heat exchanger configured to exchange heat between the refrigerant that flows out of the inside condenser and an outside air;
an inside evaporator configured to exchange heat between the refrigerant that flows out of the outside heat exchanger and the air such that the refrigerant evaporates;
a refrigerant circuit switcher configured to switch a refrigerant circuit between a heating circuit and a defrosting circuit;
an auxiliary heater configured to heat the air;
an air passage forming portion defines an air passage through which the air flows; and an air passage switcher configured to switch the air passage between a first passage and a second passage; wherein the inside condenser, the inside evaporator, and the auxiliary heater are disposed in the air passage, the air-conditioning controller comprises:

one or more processors;

a memory coupled to the one or more processors and storing program instructions that when executed by the one or more processors cause the one or more processors to at least:
- control the refrigerant circuit switcher to switch the refrigerant circuit to:
  - the heating circuit during a heating mode for heating the air-conditioning target space such that the refrigerant releases heat at the inside condenser and is decompressed to evaporate at the outside heat exchanger; and
  - the defrosting circuit during a defrosting mode for defrosting the outside heat exchanger such that the refrigerant releases heat at the outside heat exchanger and is decompressed to evaporate at the inside evaporator; and
- control the air passage switcher to switch the air passage to:
  - the first passage during the heating mode such that the air passes through the inside evaporator, the inside condenser, and the auxiliary heater in this order; and
  - the second passage during the defrosting mode such that the air bypasses the inside condenser and passes through the inside evaporator and the auxiliary heater in this order; and a heating performance controller configured to control a heating performance of the auxiliary heater, wherein the heating performance controller is configured to control the heating performance of the auxiliary heater in the defrosting mode to be higher than the heating performance of the auxiliary heater in the heating mode.

* * * * *